June 10, 1952 — J. W. SHEEHAN — 2,600,174
CONVEYER CHAIN
Filed Nov. 18, 1948 — 2 SHEETS—SHEET 1
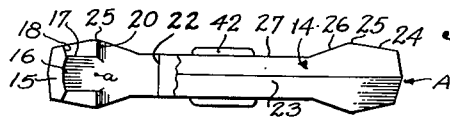
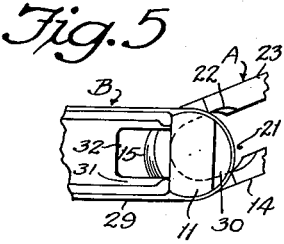
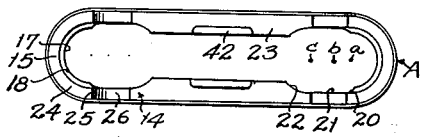
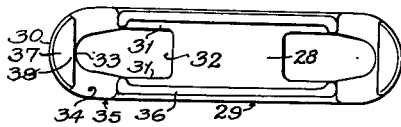
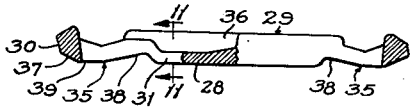
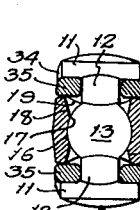
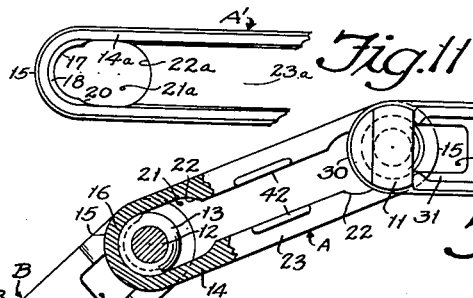
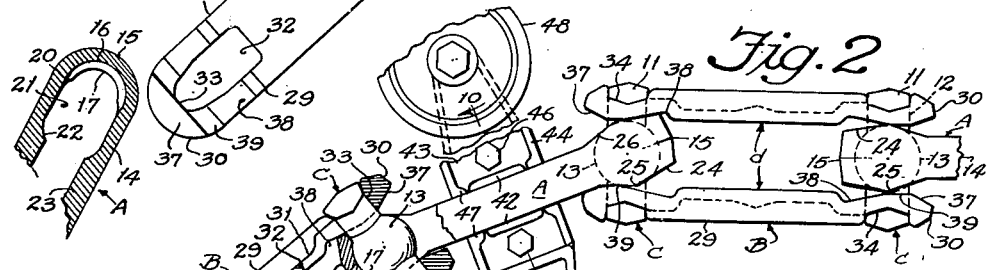
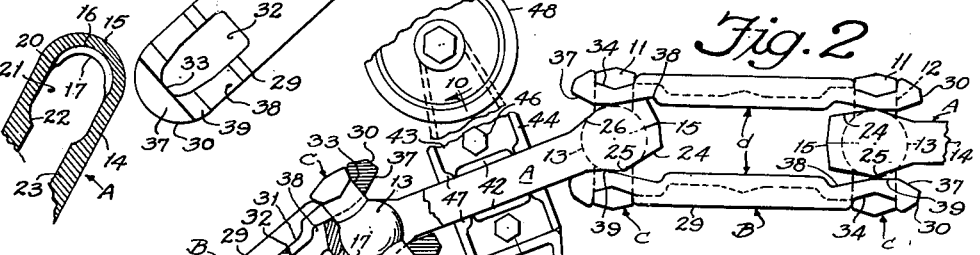
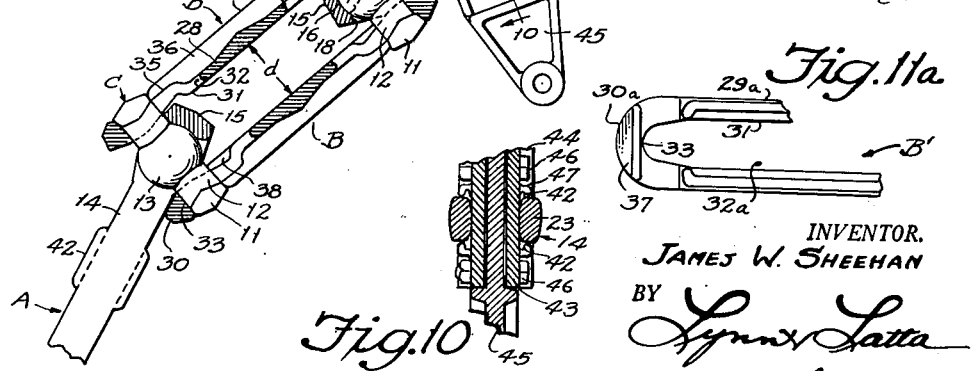
INVENTOR.
JAMES W. SHEEHAN
BY Lynn Latta
—ATTORNEY—

June 10, 1952  J. W. SHEEHAN  2,600,174
CONVEYER CHAIN
Filed Nov. 18, 1948  2 SHEETS—SHEET 2

INVENTOR.
JAMES T. SHEEHAN
BY Lynn Latta
—ATTORNEY—

Patented June 10, 1952

2,600,174

UNITED STATES PATENT OFFICE 2,600,174

CONVEYER CHAIN

James William Sheehan, Venice, Calif.

Application November 18, 1948, Serial No. 60,801

11 Claims. (Cl. 74—246)

This invention relates to industrial conveyor chains. The general object of the invention is to provide a conveyor chain capable of bending through a relatively sharp radius both in its sprocket plane and transversely to that plane. Stated somewhat differently, the invention contemplates a conveyor chain of which the links are capable of limited universal pivotal movement relative to each other. This is quite important for the reason that there are many conveyor installations in which it is desirable to have the conveyor make a sharp bend either upwardly or downwardly from one level to another level of operation. The normal plane of bending movement of the chain is a horizontal plane, and such vertical bending movement must be accommodated by a flexing of the chain in a direction transverse to its sprocket plane.

The conventional conveyor chain has no provision for universal pivotal movement except to the small extent permitted by play in its joints and actual flexing or springing of its links. It is possible to operate such a chain with a bend therein transverse to its sprocket plane, but the bend must be on a radius of eight feet or more and a bend of such broad curvature must necessarily cause a waste of valuable factory space. Furthermore, the forcible flexing of the links of the chain in order to accommodate such a bend causes the metal therein to become distorted in shape, and finally to crystallize and fail at a much earlier age than if it were not subjected to flexing strains.

At least one attempt to provide a universally pivoting conveyor chain has been made. Such prior chain however has a number of drawbacks, among which are its inability to resist telescoping except under certain conditions, and its rather limited bending angle.

A primary objective of the present invention is to provide a universally pivotal chain capable of only very limited telescoping movement. This is quite an important feature, since a conveyor chain, when it breaks, is capable of inflicting great damage if it is a telescoping chain. One of the most important considerations that has occupied the attention of engineers in the design of the conventional type of conveyor chain is to make the chain what is known as "non-telescoping." The chain of the present invention is of the non-telescoping type. At the same time, it is capable of being readily assembled and disassembled without the necessity for welding sections of links together or using such securing devices as cotter pins, etc. That is to say, the invention contemplates the use of one piece, forged links and a headed type of pivot pin for securing the links together and at the same time arranging the parts so as to permit assembly and disassembly of the links.

Another object of the invention is to provide a chain capable of a greater degree of lateral flexibility than has been accomplished in any prior chain such as for example the conventional chain mentioned above. Furthermore, the invention contemplates achieving a greater bending angle and at the same time increasing the bearing area at the ends of the center links, as contrasted to the amount of bearing area provided in prior chain. The invention further aims to provide amplified load bearing strength in the end portions of the center links of such a chain.

A further object is to provide a chain capable of freely travelling in a helical path at a relatively small radius (e. g.—20 inches) about a helix axis. In this respect, the invention provides a chain capable of flexing laterally at any position of normal bending of its links (in the direction of their sprocket planes).

Other objects will become apparent in the ensuing specifications and appended drawings in which:

Fig. 1 is a plan view, partially in section and partially disassembled, of a portion of a conveyor chain embodying our invention;

Fig. 2 is a side view of a section of said chain, shown partially in cross section;

Fig. 3 is a transverse sectional view of the chain taken on the line 3—3 of Fig. 1;

Fig. 4 is a side view illustrating the relative positions assumed by adjacent links in a stretch of chain travelling in a helical path;

Fig. 5 is a plan view of the same;

Fig. 6 is a side view, partially in section, of one of the center links of the chain;

Fig. 7 is a plan view of the center link;

Fig. 8 is a plan view of one of the side links of the chain;

Fig. 9 is a side view, partially in section, of one of the side links;

Fig. 10 is a sectional view illustrating one of the center links with a hanger attached thereto;

Figs. 11 and 11a are plan views of modified link structures;

Figure 12:
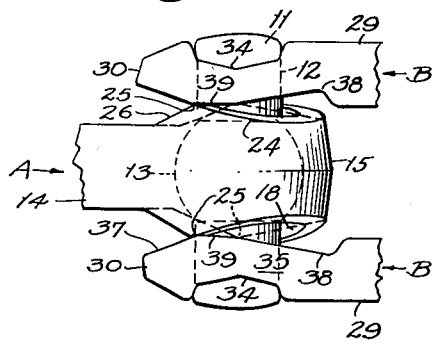
Fig. 12 is a detail view illustrating a sprocket plane turn between adjacent links.

The conveyor chain of my invention is of a type embodying alternating center links A and pairs of side links B the ends of which embrace the ends of the center links A and are pivotally attached thereto by pivot pins C. The pivot pins C are of the headed type, each pin including a pair of T-heads 11 joined to corresponding trunnions 12. The trunnions 12 are joined by a central ball bearing element 13.

Each center link A is in the form of an elongated closed annulus including straight side bars 14 joined at their ends by semi-circular loop portions 15. Each loop portion 15 has an inner bearing surface 16 of spherical contour, defined between semi-circular ridges 17 that are offset inwardly from the upper and lower sides of the link respectively. From the ridges 17, beveled faces 18 provide relief spaces 19 (Fig. 3) to permit the desired degree of lateral movement of the pivot pins C with reference to the center links. The spherical bearing surfaces 16 disappear in shoulders 20 which define the outer extremities of elongated apertures 21 through which the bearing elements 13 may be inserted into and removed from the center links A. The inner extremities of the apertures 21 are defined by shoulders 22 which constitute the end extremities of widened intermediate portions 23 of the side bars 14 of the central link. The shoulders 20 and 22 are rounded to conform to the curvature of the ball elements 13. In order to pass out of an aperture 21, a ball element 13 must move from its normal position seated against seat 16 toward the center of the link a distance approximately equal to the radius of curvature of seat 16, i. e. the distance in which its center moves from the center of curvature of seat 16 (indicated at $a$ in Fig. 7), to the center of curvature of shoulders 20 (indicated at $b$ in Fig. 7). The ball element may pass through the aperture at any point between points $b$ and $c$ (the centers of curvature of shoulders 20 and 22 respectively).

The shoulders 22 function to limit possible telescoping movement of adjacent links to a maximum extent equal to the distance between points $a$ and $c$. It will be readily apparent that this distance is less than 1/3 of the distance that telescoping could occur at both ends of a link A if unlimited telescoping were possible. Telescoping is limited by contact of ball elements 13 with shoulders 22. The about of damage that can be caused by the breaking of a moving chain having such limited telescoping movement is far less than that which can be caused by the breaking of a moving chain having no restriction upon telescoping.

Beginning at the base of the shoulders 22, each end of the link A is thickened in a direction transverse to the general plane of the link. The widened end portions of a link A are defined between tapered edges 24 extending from the outer extremities of the link centrally to high points or humps 25, and shoulders 26 which are inclined inwardly and centrally from the humps 25 to the parallel edges 27 of the thickened intermediate portions 23 of the side bars 14. The planes of the tapered outer edges 24 and the shoulders 26 are tangent to the ball elements 13 in the assembled, extended, operating positions of the links shown in Fig. 10. The humps 25 are curved to conform to the curvature of the periphery of a ball element 13, and are located in the transverse planes of the centers of a spherical curvature of bearing surfaces 16 (Fig. 6).

Each side link B (Fig. 8) comprises a central web portion 28 joining a pair of side bars 29, and a pair of loop ends 30 joined to the ends of the bars 29. The web 28 is continued along the inner sides of bars 29 to form flanges 31. Defined between the web 28, the flanges 31 and the loop members 30 are apertures 32 which receive the trunnion members 12 of pivot pins C. The outer ends of apertures 32 provide semi-circular seats 33 for bearing engagement with the trunnions 12. The T-heads 11 of pivot pins C are received in notches 34 which are formed partially in the side bars 29 and partially in the end loops 30. The bottoms of notches 34 are defined by thinned arms 35 (joining side bars 29 to end loops 30). The arms 35 are disposed substantially in the plane of the central web member 28, and the side bars 29 include flange portions 36 which extend outwardly from the web members 28. The inner sides of the loops 30 are beveled as at 37 to provide clearance for the central links A when the links are laterally turned with reference to each other as in Fig. 2.

In the inner sides of side bars 29 and arms 35 are wedge-shaped clearance notches 38. Between the outer extremities of clearance notches 38 and end bevels 37 are lands 39, which are aligned with the inner sides of side bars 29. The junctions between lands 39 and notches 38 are located in the central transverse planes of notches 34 and of the axes of trunnions 12. The lands 39 are therefore located toward the ends of links 13 from these axial planes. This arrangement makes it possible for adjacent links A and B to hinge relative to each other about trunnions 12 while maintaining uniform spread between links B by the engagement of humps 25 against lands 39. This is illustrated in Fig. 12 in which the in-line position of a link A relative to links B with humps 25 at the inner extremities of lands 39, is indicated in dotted lines, and in which a position of about 45 degrees shift from the in-line position of link A, is shown in full lines, with humps 25 adjacent the outer extremities of lands 39. In actual operation, the maximum shift away from in-line positions will be less than 20 degrees as in Fig. 1.

The location of inner extremities of lands 39 at the transverse axial planes of trunnions 12 makes it possible for links A to turn laterally with reference to links B as in Fig. 2, while maintaining the same spread between links B. This will be apparent from the fact that humps 25 lie on an imaginary cylindrical surface projected laterally from the periphery of (and therefore the same diameter as) ball bearing elements 13, and therefore remain tangent to lands 39 at the inner extremities thereof, consequently maintaining uniform spacing of the lands. It is therefore apparent that such uniform spread is maintained in both sprocket-plane turns (as in Fig. 1) and lateral turns (as in Fig. 2) of the chain.

The lands 39 extend farther toward the ends of links B than is required for maintaining the uniform spread of links B in either such turns, single curvature or planar form. However, in addition to such single curvature or planar turns, the invention also provides for compound curvature turns in which the chain assumes a helical path. In this case, a link A, turned through an angle of, e. g., 10 degrees in a sprocket-lane turn (in which humps 25 have moved part-way toward outer extremities of lands 39) may, from such turned position (a position intermediate the two positions of Fig. 12) make a lateral turn in which one of humps 25 (the upper one of Fig. 4)

will move closer to the outer end of its coacting land 39, still maintaining the same spread between links B. This will be apparent from the fact that the lands 39 define opposed parallel planes and the humps 25 define a cylinder (as noted above) of uniform radius which remains tangent to these two parallel planes even though the cylinder be pivoted about an axis (the axis of trunnions 12) at right angles to its own axis, and which, after being thus pivoted (in a sprocket-plane turn) may be then rotated about its own axis (to bring link A to the position of Fig. 4) while still maintaining the tangency to the planes of lands 39, and therefore maintaining their uniform spacing. This is important, since by maintaining links B at all times in snug engagement with heads 11, the tension loads are transmitted more directly to arms 35 and are not concentrated merely at the outer extremities of notches 34. Also, while at the same time, wear in the notches 34 is inhibited by preventing relative movement and periodic looseness between heads 11 and notches 34.

The end bevels 37 and clearance notches 38 provide for a 10° lateral turn between adjacent links and at the same time make it possible for the intermediate portions 27 and the end loops 15 of central links A to be wider in proportion to the clearance distance $d$ between the inner faces of the side links B, than is possible in prior art chains. The provision for greater width in the end loops 15 of central link A is extremely important since these end loops must bear the full load transmitted through the chain and are the parts that are most likely to fail first.

Because of the restriction of telescoping provided for by shoulders 22, the invention has encountered a difficult problem in providing for assembly and disassembly of the chain without resorting to such expedients as cotter pins instead of the T-heads 11, or forming some of the links in sections and welding them together in the assembling process. Neither of these expedients is satisfactory for a chain which must be of maximum ruggedness in order to stand up under the punishment that is given to an industrial conveyor chain. In such a chain, it is mandatory that the links and pivot pins be of forged construction, and the integral T-head construction of the pivot pins is considered almost equally mandatory. The present invention therefore contemplates the use of forged parts throughout and the use of the integral T-head pivot pin construction, while at the same time limiting telescoping and yet providing for ready assembly and disassembly.

Links A are provided with flange 42. Hanger arms 43 having marginal flanges 44 are assembled between the arms 23, with a central hanger arm 45 sandwiched therebetween, and are secured together by bolts 46 extending therethrough. The flanges 44 are interrupted between lugs 47 which define notches that receive the side arms 23, with the ends of the flanges 42 received between the lugs 47 to position the hangers against shifting longitudinally of the links A. The hanger arms 43 carry conventional pulleys 48 adapted to travel conventionally upon supporting rails (not shown).

Fig. 1 illustrates a sprocket plane turn. Fig. 2 illustrates a lateral turn. Ordinarily, the chain will operate on horizontal sprockets, rotating on vertical shafts. Fig. 1 therefore represents a plan view while Fig. 2 represents an elevation, a lateral bend of Fig. 2 being in a vertical plane.

Such a vertical turn is often needed in order to transport a chain from one level to another. For example, it may be desirable to have a conveyor chain in a factory operate for a while at one level, passing around a number of sprockets, and to suddenly shift either upwardly or downwardly to a different level. When operating in the one level, the chain will make the normal sprocket plane turn about the sprockets on which it is travelling, but in shifting vertically to a new level, it must make the lateral bend of Fig. 2. As previously stated herein, in all prior chains that have been available commercially, any vertical turn must be one in which the links are forced to stretch on one side and compress on the other side, and tremendous forces are required to thus forcibly bend a chain that is not mechanically designed for such bending. The shortest radius that it has been possible to thus forcibly bend a chain of the prior art is a radius of about ten feet. As contrasted to this, my invention permits a chain to make a lateral bend in about a radius of only ten inches, and without any stressing of the links.

Operation of the chain in a helical path may be desirable for the purpose of translating a chain from a particular point at one level in a vertical direction either upwardly or downwardly, without materially shifting the individual links from substantially horizontal positions. For example, a stretch of the chain may be caused to pass in a number of turns in a helical path in which the maximum inclination of any link from the horizontal is that indicated in Fig. 4. Thus it becomes possible to maintain all hanger brackets in a depending position and avoid forcing them to project outwardly in a horizontal direction while the chain is passing through a vertical stretch of its path.

Figure 13:
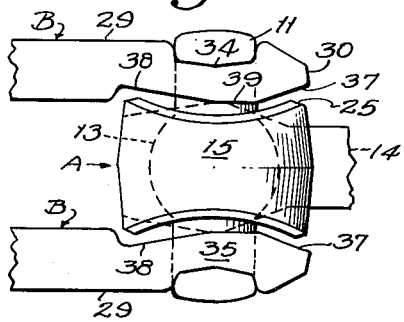

The invention provides for disassembly of the chain by a series of steps beginning with that of turning a link A about the axis of trunnions 12 of a pivot pin C to a position at right angles to the in-line position. This first step is indicated in Fig. 13, in which the in-line position of link A is shown in dotted lines and the position at right angles to the in-line position is shown in full lines. This latter position is also shown in Fig. 14, which is an inverted plan view of Fig. 13.

Figure 15:
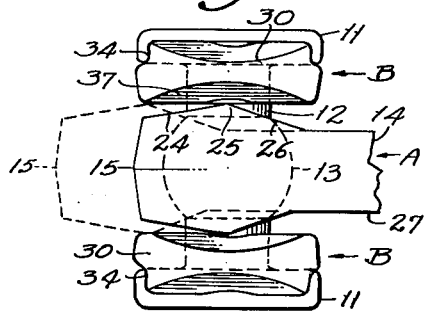

The next step of the disassembling process is to shift the link A along its longitudinal axis the full extent permitted by the aperture 21, i. e. until shoulders 22 engage ball element 13. This step is illustrated in Fig. 15, wherein the link A is shown in full lines in the same position as that of Figs. 13 and 14, and, in dotted lines, is shown in the position in which it has been shifted longitudinally until stopped by engagement of shoulders 22 against ball 13. At this point, it may be noted that in shifting link A to a position at right angles to its normal in-line position, humps 25 have been moved into the clearance spaces provided by clearance notches 38 and bevels 37, and that the narrowest (end) portion of loop 15 has moved between lands 39. Consequently, with the links B maintained in engagement with heads 11, considerable clearance space has developed between all portions of loop 15 and links B. This makes it easy to shift the link A linearly to the dotted line position of Fig. 15. In this position, the lands 39 at one side of the chain have now been placed substantially at the center of loop 15, directly between humps 25 as indicated in Fig. 15, and, by referring back to Fig. 13, it is apparent that the deepest portions of notches 38 are directly opposite the respective inclined edges 26 of arms 14 of loop A, while relief spaces provided by bevels 37 are opposite edges 26 of the other arm 14. Thus it becomes possible for links B to drop toward each other to the positions shown in Fig. 17, or, alternatively, the positions shown (in full lines below and in dotted lines above) in Fig. 16.

Figure 18:
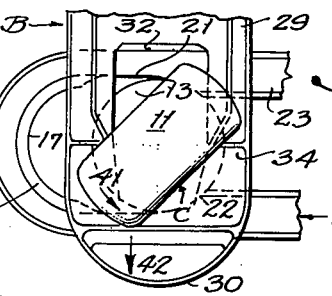
Figure 17:
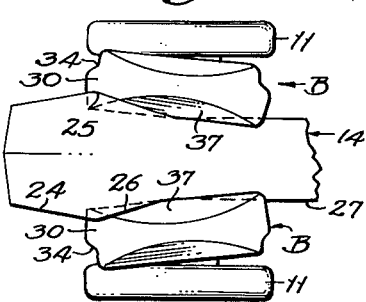

With the links B thus moved inwardly as in Fig. 17, the heads 11 of pivot pins C are able, at one end of each, to clear the loop members 30 as indicated in Fig. 17. It then becomes possible to rotate the pivot pin C as indicated in Fig. 18, which is a plan view of Fig. 17 with the pin rotated 45 degrees from the position of Fig. 17. As the pin C is thus rotated, the right hand ends of heads 11, as viewed in Figs. 17 and 18, will clear arms 29 at the inner extremities of notches 34, while the left hand ends of heads 11, which do not clear the shoulders at ends of arms 29 defining the outer sides of notches 34, will engage these shoulders as indicated in Fig. 18 and move the links B transversely of link A until the heads 11 have become aligned with apertures 32. The rotation of pin C is in the direction indicated by arrow 41 of Fig. 18, and the transverse movement imparted to links B is indicated by arrow 42 of Fig. 18. When the heads 11 have become aligned with apertures 32 the chain will fall apart, heads 11 passing through apertures 32.

Figure 16:
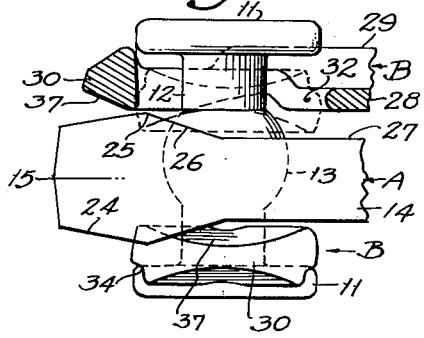
Figs. 13 to 17 inclusive are views illustrating successive steps in disassembly of the chain.
Figure 14:
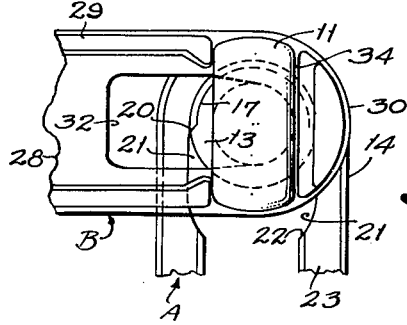

An alternative method of disassembly from the stage of Figs. 13-15 on, is to move links B toward each other to the positions shown in full lines at the bottom and in dotted lines at the top of Fig. 16, while maintaining one of the heads 11 (e. g. the lower one as illustrated in Fig. 16) snugly in engagement with its coacting notches 34. The other head 11 will then be raised to a position completely clearing the adjacent link B, and that link may then be rotated from its position shown in dotted lines in Fig. 16 to its position shown in full lines, in section, such position being arrived at by a combined helical and spiraling movement in which the link B is rotated, is simultaneously moved toward the adjacent head 11, and is also shifted longitudinally so as to move its outer end away from trunnion 12 and bring aperture 32 into alignment with head 11. This combined helical and spiraling movement can be accomplished without binding at any point, and after the full line position of Fig. 16 is reached, the link B may be simply lifted over head 11, permitting the remaining parts to drop apart.

From the foregoing, it will be apparent that disassembly of the chain is made possible by rotating the links to the right angle positions of Figs. 13-15. It is also made possible by the presence of notches 38 and relief bevels 37. Thus it becomes apparent that notches 38 and bevels 37 have the dual function of providing for the lateral turning of the chain as in Fig. 2, and also providing for disassembly of the chain.

The normal extent of turning of the links with reference to each other, occurring in the passing of the chain around a sprocket or idler pulley, is not such as to permit any disassembly of the chain. In fact, as previously pointed out, this degree of turning (and in fact a much greater degree) may occur without permitting any relaxing at all of the snug engagement of heads 11 in notches 34, this result being derived from the engagement of humps 25 against lands 39. In other words, during all phases of normal operation (including sprocket plane turning as in Fig. 1, lateral turning as in Fig. 2, or a combination of both to produce a helical turn as in Fig. 4) the bearing humps 25 remain in engagement with lands 39 and thereby prevent movement of links B toward each other. It is only when a link A has been shifted around the trunnion axis of a pin C to an extent exceeding 45° displacement from the in-line position, that humps 25 separate from lands 39 and permit links B to move away from heads 11. There is no condition in service in which such 45 degree displacement would take place. Ordinarily, the smallest diameter around which the chain will make a turn will be one having a radius of about 10 inches (approximately twice the length of a link) and such a turn may be negotiated with the links angularly displaced about as shown in Figs. 1 and 2. Fig. 4 illustrates a condition in which the chain is making a turn to this extent both in the sprocket plane and laterally. As previously stated, under this condition the humps 25 continue to remain in engagement with lands 39.

One of the important characteristics of the invention is the steepness of inclination of the shoulders 26, which is such that the distance from the humps or apices 25 to the bases of the shoulders 26 is not substantially greater than the radius of end loops 15, thus making it possible for side links B to move inwardly to the extent indicated in Figs. 16 and 17, when rotated to the 90 degree positions of Fig. 14 and then shifted away from the end of link A a distance substantially equal to the loop radius. Thus the telescoping at each joint of the chain, is restricted to approximately loop radius.

It may be noted that the notches 38 are at maximum depth at points approximately loop radius away from the junctions between notches 38 (i. e., the transverse plane of the pivot axis) and lands 39. This provides for (a) receiving the end loops 15 with just adequate clearance in the lateral turning of the chain as in Fig. 2, and (b) receiving a side arm 14 to allow mutual approach of side links B when adjacent links are in the positions of Figs. 13-15.

It is to be understood that the center links A need not necessarily be all of a single loops construction with side arms 23 spaced apart throughout their length. Except for the requirement for space to receive the hanger arms 43, 45, the arms 23 could be connected between the inner extremities of openings 21. Also, the links B need not necessarily include the web 28 joining its side bars 29. The web 28 functions as a reenforcing member, and if the arms 29 are made heavy enough, the web 28 can be dispensed with. These two alternative link constructions are shown in Figs. 11 and 11a. In the modified link A' of Fig. 11, the apertures 21a are separated by a central web member 23a and shoulders 22a constitute the end extremities of the web member 23a. Arms 14a join the web member 23a to the end loops 15 and define the side extremities of apertures 21a. In other respects, link A' is the same as the link A of Fig. 7. In the link B' shown in Fig. 11a, end loops 30a are joined by arms 29a which are separated by a central space 32a extending the full length of the link. In other respects, the link B' is the same as the link B of Fig. 8, and similar reference numerals are used to indicate the cylinder parts and characteristics.

I claim:

1. In a universally pivoting conveyor chain, a series of link units each comprising a center link, two side links and a pivot pin connecting the center link to the side links; said side links each having two ends loops and means connecting said end loops and cooperating therewith to define elongated apertures arranged longitudinally of the side link at the respective ends thereof, and having a pair of transversely extending outwardly facing notches in each of said end loops; said center link having two end loops and side bars connecting said end loops, said bars having inwardly thickened central portions and thinner end portions connecting the same to said end loops, said thickened central portions, where they join said end portions, defining shoulders which are opposed to said end loops to define at each end of said center link an elongated opening arranged longitudinally of said center link, said center link end loops each having a semi-spherical internal socket; and said pivot pin including a central ball bearing element, trunnions extending from the respective poles of said bearing element and through said side link apertures, and elongated heads on the ends of the respective trunnions, seated in the respective side link notches; said center link shoulders being spaced from their respective opposed end links distances each less than a third of the link length, and functioning as stops to engage said bearing element so as to restrict movement of said bearing element longitudinally of said center links, thereby to reduce telescoping to a minimum.

2. A chain as defined in claim 1, wherein said center link end loops have widened lateral portions defining apices normally engaging the side links to maintain full separation thereof, the edges of said center link loops converging from said apices to the edges of the central portions of the center link to define shoulders having a length not substantially greater than loop radius, whereby to provide clearance for mutual approach of the side links sufficient to free at least one of said heads from its confining notches when the center link is moved to a position substantially at right angles to the side links and is then shifted longitudinally to move the adjacent loop end away from the pivot axis a distance substantially equal to loop radius.

3. A chain as defined in claim 2, wherein said center link openings are restricted in length so that the total permissible longitudinal shift of a bearing element therein is not substantially greater than loop radius and wherein the side links have clearance notches for receiving the center link loops in laterally turned positions of the links, said notches being defined by edges which begin at the surfaces that are engaged by said apices and are thence inclined outwardly and toward the opposite ends of the links.

4. A chain as defined in claim 3, wherein said clearance notches are of maximum depth at points located substantially loop radius from the centers of said head receiving notches, and are terminated by abrupt shoulders closely adjacent said points of maximum depth.

5. In a universally pivoting conveyor chain, a series of link units each comprising a center link, two side links and a pivot pin connecting the center link to the side links; said side links each having two end loops and means connecting said end loops and cooperating therewith to define elongated apertures arranged longitudinally of the side link at the respective ends thereof, and having a pair of transversely extending outwardly facing notches in each of said end loops; said center link having two end loops and means connecting said end loops and cooperating therewith to define at each end of said center link an elongated opening arranged longitudinally of said center link, said center link end loops each having a semi-spherical internal socket; and said pivot pin including a central ball bearing element, trunnions extending from the respective poles of said bearing element and through said side link apertures, and elongated heads on the ends of the respective trunnions, seated in the respective side link notches; said center link openings being restricted to lengths not substantially greater than loop radius to reduce telescoping to a minimum, said side links having lands adjacent the transverse axial plane of a pivot pin seated in said notches, said center link end loops having widened lateral portions defining apices normally engaging said lands to maintain full separation of the side links, and said side links having clearance notches each commencing at one extremity of a land and gradually deepening toward the intermediate region of the side link, to a point of maximum depth located at substantially loop radius distance from the land, sufficient to provide ample clearance for the adjacent end of a center link loop while receiving said center link loop during lateral turning between the links, said clearance notches also functioning to receive side arms of the center link when the center link is turned to a transverse disassembly position relative to the side link beyond a normal operating turn, whereby to allow the side links to approach each other and provide clearance for freeing at least one of the heads of a pivot pin from its confining notches and thereby provide for relative turning between the pivot pin and a side link so as to bring an aperture of that link into alignment with the adjacent pivot pin head and allow disassembly of the cabin.

6. A chain as defined in claim 5, wherein each side link end loop has a clearance bevel commencing at the other extremity of a respective land and inclined outwardly to the end of the loop, said clearance bevels providing clearance for adjacent portions of the center link end loop between said apices and the intermediate region of the center link during said lateral turning of the links, and also functioning to receive the side arm of the center link opposite the side arm received by said clearance notches, when the center link is turned to the said transverse disassembly position.

7. In a universally pivoting conveyor chain, a series of link units each comprising a center link, two side links and a pivot pin connecting the center link to the side links; said center link having end loops each provided with a semi-spherical internal socket; said pivot pins each having end portions anchored in the end portions of said side links and a central ball bearing portion mating with and received in a corresponding socket; said side links having lands adjacent the transverse planes of the pivot axes; said center link end loops having widened lateral portions defining apices normally engaging said lands to maintain full separation of the side links, and said side links having clearance notches each commencing at one end of a respective land and deepening gradually toward the intermediate regions of the side links to points of maximum depth located substantially at loop radius from said transverse planes, the inner ends of said notches clearing the ends of said center links so that said notches may receive said center link end portions during lateral turning of the links, said lands lying in a common plane and said apices describing a cylindrical surface tangent to said plane whereby said center links may pivot laterally with reference to said side links while turned about the pivot axes at obtuse angles to the side links, whereby said chain may travel in a helical path.

8. A chain as defined in claim 7, wherein each side link end loop has a clearance bevel commencing at the other extremity of a respective land and inclined outwardly to the end of the respective loop, providing clearance for adjacent portions of the center link end loop between said apices and the intermediate region of the center link during said lateral turning.

9. A chain as defined in claim 7, wherein said lands lie toward the ends of the side links from the transverse plane of the pivot axis.

10. A chain as defined in claim 7, wherein said lands extend from the transverse axial plane of a pivot axis toward the ends of the side links a distance approximately equal to a radius of said trunnions.

11. In a universally pivoting conveyor chain, a series of link units each comprising a center link, two side links and a pivot pin connecting the center link to the side links; said side links each having two end loops and means connecting said end loops and cooperating therewith to define elongated apertures at the respective ends of the side links and having a pair of transversely extending, outwardly facing notches in each of said end loops; and said pivot pin including a central ball bearing element, trunnions extending from the respective poles of said bearing element and through said side link apertures, and elongated beads on the ends of said trunnions, seated in the respective side link notches; and said center link having two end loops, said connecting means including end portions that are spaced so as to embrace said bearing element, and thicker central portions the ends of which are positioned to engage said bearing element so as to restrict movement thereof longitudinally of the side links, and which are opposed to and spaced from said end loops so as to define elongated openings the lengths of which are such as to permit longitudinal shifts of said bearing element not substantially greater in extent than loop radius.

JAMES WILLIAM SHEEHAN.

REFERENCES CITED

The following references are of record in the file of this patent:

UNITED STATES PATENTS

| Number | Name | Date |
|---|---|---|
| 870,704 | Weston | Nov. 12, 1907 |
| 1,512,609 | Keolkebeck | Oct. 21, 1924 |
| 1,996,586 | Meyer | Apr. 2, 1935 |